US009025880B2

(12) United States Patent
Perazzi et al.

(10) Patent No.: US 9,025,880 B2
(45) Date of Patent: May 5, 2015

(54) VISUAL SALIENCY ESTIMATION FOR IMAGES AND VIDEO

(75) Inventors: Federico Perazzi, Bergamo (IT); Alexander Hornung, Zürich (CH); Philipp Krähenbühl, Stanford, CA (US); Yael Pritch, Adliswil (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/598,084

(22) Filed: Aug. 29, 2012

(65) Prior Publication Data

US 2014/0063275 A1   Mar. 6, 2014

(51) Int. Cl.
  G06K 9/46   (2006.01)
  H04N 19/117   (2014.01)

(52) U.S. Cl.
  CPC .................................. H04N 19/117 (2013.01)

(58) Field of Classification Search
  None
  See application file for complete search history.

(56) References Cited

U.S. PATENT DOCUMENTS

| | | | | |
|---|---|---|---|---|
| 7,583,857 B2 * | 9/2009 | Xu et al. | | 382/294 |
| 8,369,652 B1 * | 2/2013 | Khosla et al. | | 382/284 |
| 8,675,966 B2 * | 3/2014 | Tang | | 382/195 |
| 2005/0163344 A1 * | 7/2005 | Kayahara et al. | | 382/103 |
| 2006/0165178 A1 * | 7/2006 | Ma et al. | | 375/240.16 |
| 2008/0304742 A1 * | 12/2008 | Connell | | 382/170 |
| 2010/0322521 A1 * | 12/2010 | Tal et al. | | 382/199 |
| 2012/0002107 A1 * | 1/2012 | Damkat et al. | | 348/445 |
| 2012/0007960 A1 * | 1/2012 | Kim et al. | | 348/51 |
| 2012/0275701 A1 * | 11/2012 | Park et al. | | 382/173 |
| 2013/0084013 A1 * | 4/2013 | Tang | | 382/195 |
| 2013/0156320 A1 * | 6/2013 | Fredembach | | 382/190 |
| 2013/0223740 A1 * | 8/2013 | Wang et al. | | 382/171 |
| 2013/0342559 A1 * | 12/2013 | Reso et al. | | 345/591 |
| 2014/0003711 A1 * | 1/2014 | Ngan et al. | | 382/164 |
| 2014/0044349 A1 * | 2/2014 | Wang et al. | | 382/162 |

OTHER PUBLICATIONS

Achanta, Radhakrishna, et al. "SLIC Superpixels Compared to State-of-the-art Superpixel Methods." Journal of LaTex class files, 2011.*
Radhakrishna Achanta et al., "Salient Region Detection and Segmentation", In ICVS, 2008, 10 pages.
Radhakrishna Achanta et al., "Frequency-tuned Salient Region Detection", In CVPR, 2009, 8 pages.
Radhakrishna Achanta et al., "SLIC Superpixels", EPFL Technical Report 149300, Jun. 2010, 15 pages.

(Continued)

Primary Examiner — Li Liu
(74) Attorney, Agent, or Firm — Buckley, Maschoff & Talwalkar LLC

(57) ABSTRACT

Methods and apparatus for visual saliency estimation for images and video are described. In an embodiment, a process includes decomposing, by a processor, an image into elements, wherein each element includes at least one pixel. The processor then calculates a first image measure indicative of each element's uniqueness in the image on a per element basis, and a second image measure indicative of each element's spatial distribution in the image on a per element basis. A per element saliency measure is provided by combining the first image measure and the second image measure, or by utilizing the first image measure, or by utilizing the second image measure.

14 Claims, 6 Drawing Sheets

(56) References Cited

OTHER PUBLICATIONS

Andrew Adams et al., "Fast High-Dimensional Filtering Using the Permutohedral Lattice", In Comput. Graph. Forum, vol. 0 (1981) No. 0, 2010, 10 pages.

Shai Avidan et al., "Seam Carving for Content-Aware Image Resizing", In ACM Trans. Graph., vol. 26, No. 3, 2007, 9 pages.

Yuri Boykov et al., "An Experimental Comparison of Min-Cut/Max-Flow Algorithms for Energy Minimization in Vision", In IEEE Transactions on PAMI, vol. 26, No. 9, (pp. 1124-1137, total 34 pages), Sep. 2004.

Ming-Ming Cheng et al., "Global Contrast based Salient Region Detection", In CVPR 2011, (cover 1 pg. +pp. 409-416, total 9 pages).

Antonio Criminisi et al., "Geodesic Image and Video Editing", ACM Trans. Graph., vol. 29, No. 5, 2010, 15 pages.

Jennifer Dolson et al., "Upsampling Range Data in Dynamic Environments", In CVPR, 2010, 8 pages.

Lijuan Duan, et al., "Visual Saliency Detection by Spatially Weighted Dissimilarity", In CVPR, 2011, (pp. 473-480, total 8 pages).

Wolfgang Winhauser, et al, "Does luminance-contrast contribute to a saliency map for overt visual attention?", European Journal of Neuroscience, vol. 17, No. 5, Mar. 2003, (pp. 1089-1097, total 9 pages).

Stas Goferman, et al., "Context-Aware Saliency Detection", In CVPR, 2010, 8 total pages.

Junwei Han, et al., "Unsupervised Extraction of Visual Attention Objects in Color Images", IEEE Transactions on Circuits and Systems for Video Technology, vol. 16, No. 1, Jan. 2006, (pp. 141-145, total 5 pages).

Jonathan Harel, et al., "Graph-Based Visual Saliency", In NIPS, 2006, 8 pages.

Xiaodi Hou, et al., "Saliency Detection: A Spectral Residual Approach", In CVPR, 2007, 8 pages.

Laurent Itti, et al., "Bayesian Surprise Attracts Human Attention", In Press, Proc. Neural Information Processing Systems (NIPS), 2005, 8 pages.

Laurent Itti, et al., "A Model of Saliency-based Visual Attention for Rapid Scene Analysis", IEEE Trans, Pattern Anal. Mach. Intell., vol. 20, No. 11, 1998, 5 pages.

Timor Kadir, et al., "Saliency, Scale and Image Description", International Journal of Computer Vision, vol. 45, No. 2, 2001, 45 pages.

C. Koch, et al., "Shifts in Selective Visual Attention: Towards the Underlying Neural Circuitry", Human Neurobiology, vol. 4, No. 4, 1985, (pp. 219-227, total 9 pages).

Tie Liu, et al., "Learning to Detect a Salient Object", In CVPR, 2007, 8 pages.

Yu-Fei Ma, et al., "Contrast-based Image Attention Analysis by Using Fuzzy Growing", In ACM Multimedia, 2003, (pp. 374-381, total 8 pages).

David Martin, et al., "A Database of Human Segmented Natural Images and its Application to Evaluating Segmentation Algorithms and Measuring Ecological Statistics", ICCV Vancouver, Jul. 2001, 8 pages).

Derrick Parkhurst, et al., "Modeling the role of salience in the allocation of overt visual attention", Vision Research, vol. 42, No. 1, Jan. 2002, (pp. 107-129, total 17 pages).

Pamela Reinagel, et al., "Natural scene statistics at the centre of gaze", In Network: Computation in Neural Systems vol. 10, 1999, (pp. 1-10, total 10 pages).

Ueli Rutishauser. et al., "Is bottom-up attention useful for object recognition?", In CVPR, vol. 2, 2004, 8 pages.

Meng Wang, et al., "Image Saliency: From Intrinsic to Extrinsic Context", In CVPR, 2011 (pp. 417-424, total 8 pages).

Yun Zhai, et al., "Visual Attention Detection in Video Sequences Using Spatiotemporal Cues", In ACM Multimedia, 2006, (pp. 815-824, total 10 pages).

Zhixiang Ren, et al., "Improved Saliency Detection Based on Superpixel Clustering and Saliency Propagation", In ACM, Oct. 25-29, 2010, 4 pages.

Chenlei Guo, et al., "Spatio-temporal Saliency Detection Using Phase Spectrum of Quaternion Fourier Transform", In CVPR, 2008 8 pages.

* cited by examiner

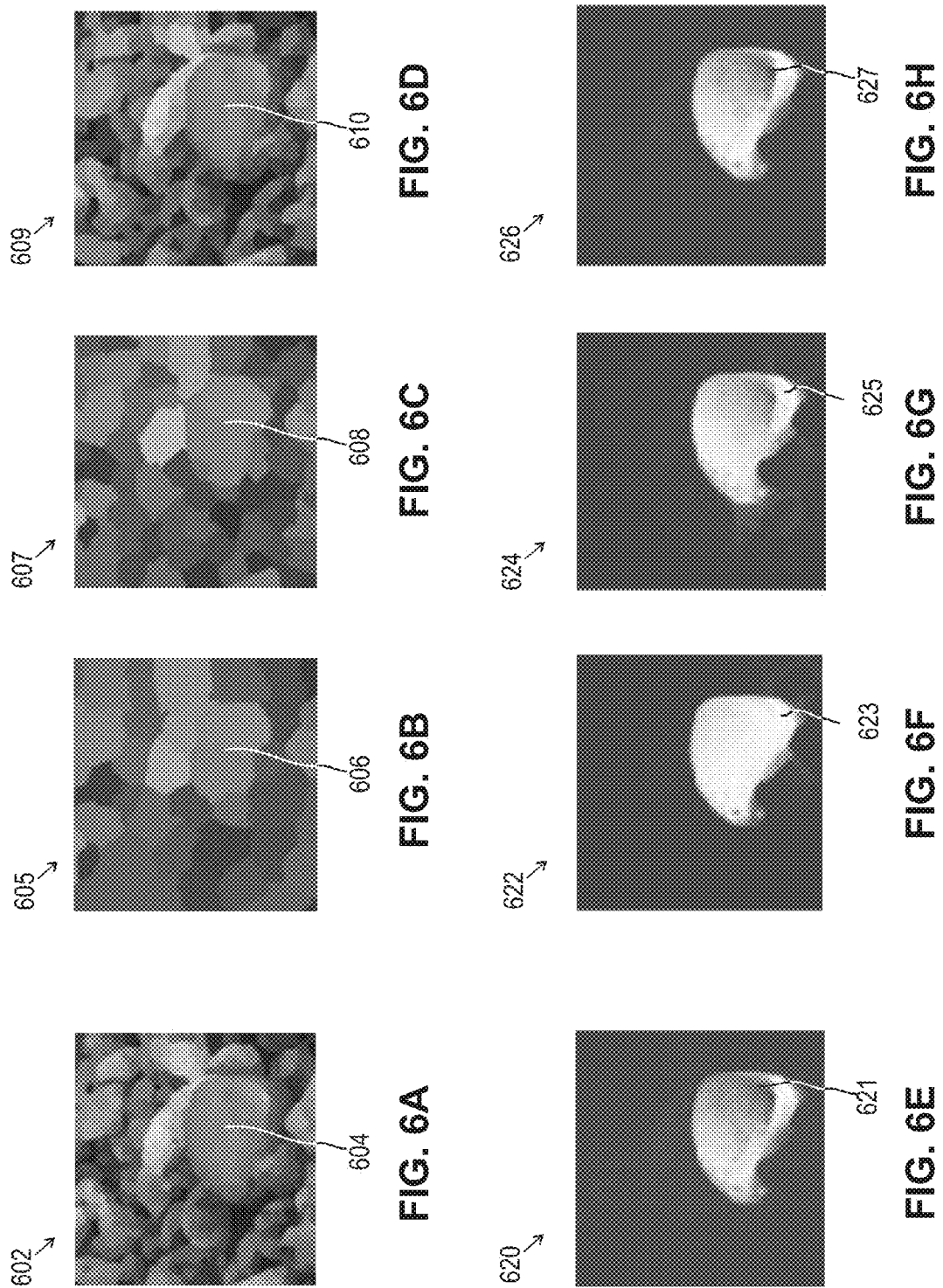

VISUAL SALIENCY ESTIMATION FOR IMAGES AND VIDEO

BACKGROUND

Saliency estimation has become a valuable tool in image processing wherein image regions of attention, by a human observer, are defined by a mask, which is referred to herein as a saliency map. But the automatic, computational identification of image elements of a particular image that are likely to catch the attention of a human observer is a complex, cross-disciplinary problem. In order to obtain realistic, high-level models, a combination of insights needs to be used from various fields such as the neurosciences, biology, and computer vision areas. Recent research, however, has shown that computational models simulating low-level, stimuli-driven attention are successful and represent useful tools in many application scenarios, including image segmentation, resizing and object detection. However, existing approaches exhibit considerable variation in methodology, and it is often difficult to attribute improvements in result quality to specific algorithmic properties.

Perceptual research indicates that the most influential factor in low-level visual saliency appears to be contrast. However, the definition of contrast in previous works is based on various different types of image features, including color variation of individual pixels, edges and gradients, spatial frequencies, structure and distribution of image patches, histograms, multi-scale descriptors, or combinations thereof. The significance of each individual feature often remains unclear, and recent evaluations show that even quite similar approaches sometimes exhibit considerably varying performance.

Methods that model bottom-up, low-level saliency can be roughly classified into biologically inspired methods and computationally oriented approaches. Biological methods are generally based on an architecture whereby the low-level stage processes features such as color, orientation of edges, or direction of movement. One implementation of this model uses a difference of Gaussians approach to evaluate those features. However, the resulting saliency maps tend to be blurry, and often overemphasize small, purely local features which render this approach less useful for applications such as segmentation, detection, and the like.

Computational methods (which may be inspired by biological principles), in contrast have a strong relationship to typical applications in computer vision and graphics. For example, frequency space methods determine saliency based on the amplitude or phase spectrum of the Fourier transform of an image. Saliency maps resulting from computational processing preserve the high level structure of an image but exhibit undesirable blurriness and tend to highlight object boundaries rather than the entire image area.

Colorspace techniques can be distinguished between approaches that use a local analysis and those that use a global analysis of (color-) contrast. Local methods estimate the saliency of a particular image region based on immediate image neighborhoods, for example, based on dissimilarities at the pixel-level, using multi-scale Difference of Gaussians or histogram analysis. While such approaches are able to produce less blurry saliency maps, they are agnostic of global relations and structures, and they may also be more sensitive to high frequency content like image edges and noise. Global methods consider contrast relationships over the complete image. For example, different variants of patch-based methods estimate the dissimilarities between image patches. While these algorithms are more consistent in terms of global image structures, they suffer from involved combinatorial complexity, and thus are applicable only to relatively low resolution images, or they need to operate in spaces of reduced dimensionality, resulting in loss of small, potentially salient detail.

Another method that also works on a per-pixel basis achieves globally more consistent results by computing color dissimilarities to the mean image color. Such a technique utilizes Gaussian blur in order to decrease the influence of noise and high frequency patterns. However, this method does not account for any spatial relationships inside the image, and thus may highlight background regions as being salient.

Another technique combines multi-scale contrast, local contrast based on surrounding, context, and color spatial distribution to learn a conditional random field (CRF) for binary saliency estimation. However, the significance of features in the CRF remains unclear. One global contrast-based approach that provides good performance generates three dimensional (3-D) histograms and computes dissimilarities between histogram bins. However, this method has difficulty in handling images with cluttered and textured backgrounds.

In view of the problems encountered when utilizing prior art approaches, the inventors recognized that it would be advantageous to develop a visual saliency estimation process characterized by the use of a reduced set of image measures to efficiently and quickly process image data to produce pixel-accurate saliency masks.

BRIEF DESCRIPTION OF THE DRAWINGS

FIGS. 6A to 6D depict a series of images visually illustrating resultant saliency maps corresponding to different numbers of image elements and FIGS. 6E to 6H illustrate resultant ground truth saliency maps of the images of FIGS. 6A to 6D in accordance with embodiments of the invention.

DETAILED DESCRIPTION

Figure 1A:
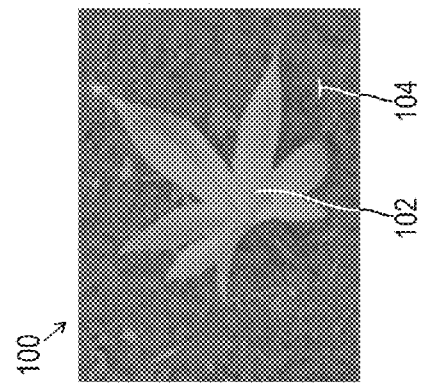
FIGS. 1A to 1F depicts a sequence of images to illustrate how image data of a source image (FIG. 1A) is processed in accordance with an embodiment of the invention to result in a salient image (FIG. 1E) as compared to a ground truth image (FIG. 1F)

In general, and for the purpose of introducing concepts of embodiments of the present invention, described are methods and apparatus for deriving a saliency measure that produces a pixel-accurate saliency map that uniformly covers the object or objects of interest in an image, and that consistently separates foreground and background elements therefrom. In an embodiment, the process uses just two types of image measures, which are employed over abstract image elements resulting in element-based saliency, and next used to produce pixel-accurate saliency masks. In some implementations, however, additional visual information (such as motion information, color priors, and the like) may be integrated to potentially create improved saliency.

In an embodiment, the visual saliency estimation process includes four steps. A first step involves decomposing a given source image into compact, perceptually homogeneous elements. As used herein, the term "image element" may be defined as a group of pixels with similar features. The features may be the pixels' values or any other features that may be calculated out of the pixels' values, such as features measuring color, texture, disparity or motion. An image's elements may include only one pixel, however, the grouping together of several pixels may allow for more robust results. It should also be noted that image elements may also be referred to herein as image clusters or super-pixels. FIGS. 6A to 6D illustrate an image 602 and its corresponding clustered images 605, 607, and 609, wherein the clustered image 605 includes 50 elements, the clustered image 607 includes 100 elements, and the clustered image 609 includes 500 elements.

Following image decomposition into elements, discriminating image measures are computed relative to each element. For example, measures that rate the uniqueness and the spatial distribution of each element are computed. Next, an element-based saliency measure is derived from the elements' measures from which a pixel-accurate saliency map is produced. This pixel-accurate saliency map uniformly covers the objects of interest and consistently separates foreground and/or the background from the salient image region. The degree of locality of these measures is controllable in a unified way. The complete image elements' measures and saliency estimation can be formulated in a unified way using separable Gaussian filters. This contributes to the conceptual simplicity of the method while allowing for a very clear and intuitive definition of contrast-based saliency, and lends itself to a highly efficient implementation with linear complexity.

In some embodiments, all involved operators can be formulated within a single high-dimensional Gaussian filtering framework. Thanks to this formulation, a highly efficient implementation with linear complexity is achieved. The same formulation also provides a clear link between the element-based saliency estimation and the actual assignment of saliency values to all image pixels.

Figure 1B:
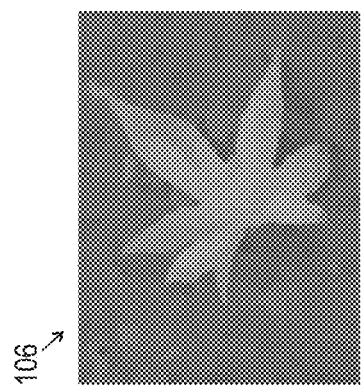
Figure 1C:
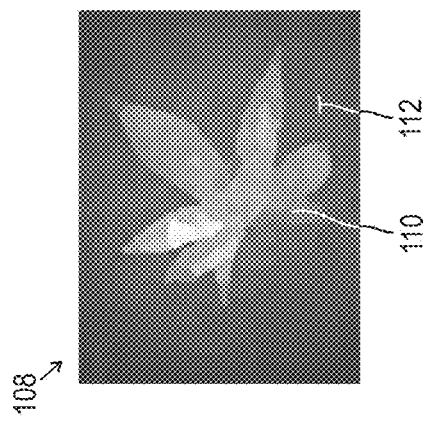
Figure 1D:
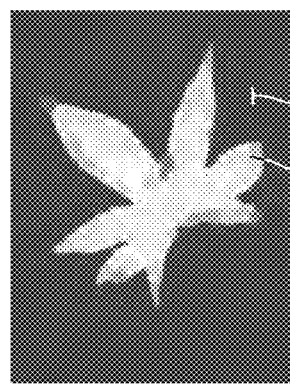
Figure 1E:
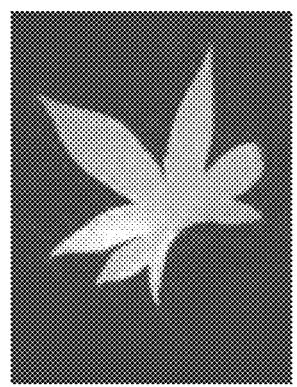
Figure 1F:
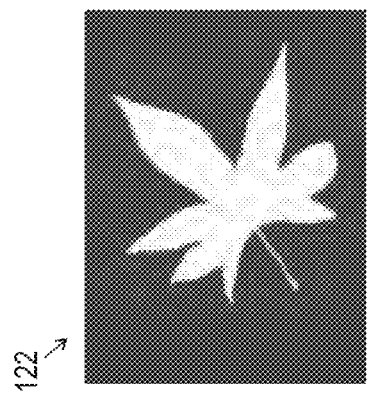

FIGS. 1A to 1F depict a sequence of images to illustrate how image data of a source image (FIG. 1A) is processed in accordance with an embodiment to result in a salient image 120 (FIG. 1E) as compared to a ground truth image 122 (FIG. 1F). In particular, FIG. 1A depicts a source image 100 of a red leaf 102 resting on a substantially green background 104 of grass that includes some texture. According to some embodiments, the source image 100 is decomposed (abstracted) into basic elements to result in a decomposed or abstract image 106 as shown in FIG. 1B. The decomposed image 106 includes basic elements that preserve relevant structure, such as the outline of the leaf, but the process abstracts or blurs undesirable detail. Specifically, a process is utilized in which each element locally abstracts the image by clustering pixels with similar properties into perceptually homogeneous regions. A pixel's property may be computed based on the pixel's value (e.g., color) or based on the pixel's immediate neighborhood (e.g., texture). Discontinuities between image regions, such as strong contours and edges in the image, are preserved as boundaries between individual elements. Finally, constraints on shape and size that are typically part of a clustering method (such as SLIC), allow for compact, well localized elements. In an implementation, an edge-preserving, localized over-segmentation process based on color is utilized so that the contrast between whole image regions can be evaluated using just those elements. The quality of the saliency maps is extremely robust over a wide range of image elements. The desired number of elements depends on the application (relative size of object of interest in the image) and may be controlled by the clustering algorithm's parameters.

Next, in some implementations, based on the basic elements of the abstracted image 106, two image measures are defined that are used to compute each element saliency. The first image measure, element uniqueness (e.g., color uniqueness), implements the commonly employed assumption that image regions, which stand out from other regions in certain aspects, catch our (human) attention and thus should be labeled as being more salient. Thus, FIG. 1C depicts the resulting unique phase leaf image 108 resulting from uniqueness processing, wherein the leaf 110 is easily discernible from the background 112. In some embodiments, the difference between each respective abstracted element is evaluated from all other elements that constitute an image, which essentially measures the "rarity" of each element. It is recognized that, in one form or another, many previous algorithms for contrast-based saliency have been based on such an assumption. However, the abstraction process discussed above renders variation on the pixel level due to small scale textures or noise irrelevant, while discontinuities such as strong edges stay sharply localized in contrast to previous multi-scale techniques that often blur or lose this information.

While saliency implies uniqueness, the opposite might not always be true. Thus, ideally image features (such as colors) belonging to the background will be distributed over the entire image exhibiting a high spatial variance, whereas image features belonging to the foreground objects are generally more compact.

The second image measure used in the present process measures elements' features distribution or elements' features compactness (the spatial distribution of elements with similar features), and it relies on the compactness and locality of similar image abstracting elements. Thus, in some embodiments a corresponding second measure of contrast renders unique elements more salient when they are grouped in a particular image region rather than evenly distributed over the whole image. (Techniques that are based on larger-scale image segmentation lose this important source of information.) Accordingly, FIG. 1D depicts the distribution phase leaf image 114 which includes a well-defined leaf image 116 and background 118, as shown.

As mentioned above, the two image measures are defined on a per-element level. In accordance with the present process, in a final step, the actual saliency values are assigned to the input image to get a pixel-accurate saliency map. Thus, FIG. 1E shows the result of combining data of the unique phase leaf image 108 and the distribution phase leaf image 114 to form the saliency phase leaf image 120. For comparison purposes, FIG. 1F illustrates the "ground truth" leaf image 122, which ground truth image may be manually generated from the source image 100 for the purpose of benchmarking an automatic method. The process in accordance with the above described operation permits the assignment of the proper saliency values even to fine pixel-level detail that was excluded on purpose (during the abstraction phase), but for which a saliency estimate is desirable, possibly because it conforms to the global saliency analysis.

As mentioned above, the methods described herein result in providing saliency maps that are extremely robust over a wide range of image elements. For example, FIG. 6A depicts the original image 602 and FIG. 6E shows its ground truth saliency map 620. FIGS. 6B, 6C and 6D depict the original image clustered into different number of image elements and the corresponding resultant saliency maps when the processes described herein are utilized. In particular, the original image 602 depicts a plurality of rocks, wherein one rock 604 is larger and of a slightly different grey color than the other rocks so as to stand out or be of most interest in the image (if the original image was in color, for example, then the rock 604 may be red in color while the other rocks are brown). When the original image 602 is clustered into 50 image elements, the resultant clustered image 605 includes elements from the large rock 606 and elements from the other rocks, all preserving the original boundaries of the rocks. When the original image 602 is clustered into 100 image elements, the resultant clustered image 607 includes more elements from the large rock 608 and depicts more detail; and when the original image 602 is clustered into 500 image elements, the resultant clustered image 609 includes even more elements from the large rock 610 with details that make the image appears close to the original image 602. FIGS. 6F, 6G and 6H depict images 622, 624, and 626 to illustrate the resultant saliency maps when processing occurs using clustered images 605, 607, and 609, respectively. As can be seen, all the resultant saliency maps (622, 624 and 626) are similar to the ground truth saliency map 620, demonstrating the robustness of the present methods with regard to the number of elements employed. The number of elements to use for processing may depend on the application (for example, the relative size of object of interest in the image) and may be controlled by the clustering algorithm's parameters.

Figure 2:
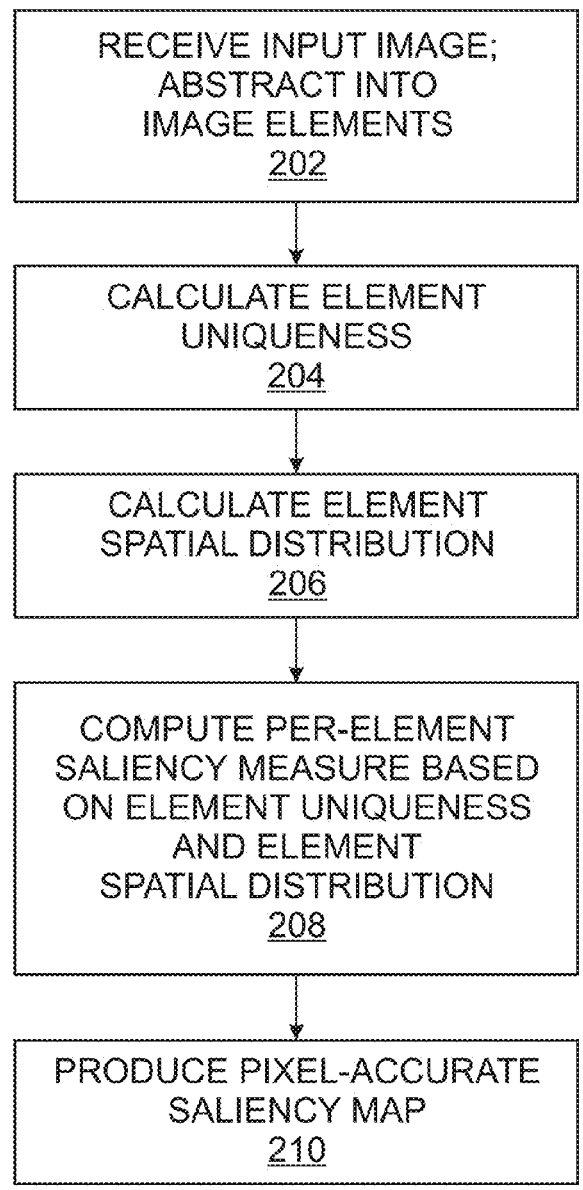
FIG. 2 is a flowchart of an image saliency process according to an embodiment of the invention.

FIG. 2 is a flowchart of an image saliency process 200 in accordance with the methods described herein. In some embodiments, an input image is received 202 by a processor and then is decomposed or abstracted 202 into image elements that preserve relevant structure while removing undesirable details. In some embodiments, an adaptation of the simple linear iterative clustering (SLIC) super-pixels process is utilized to abstract the source image into perceptually homogenous or uniform regions. One of skill in the art understands that super-pixels provide a convenient methodology for computing local image features. Superpixels capture redundancy in the image and greatly reduce the complexity of subsequent image processing tasks. In particular, SLIC super-pixels segment an image using K-means clustering in the RGBXY color space. The RGBXY space yields local, compact and edge aware superpixels, but does not guarantee compactness. Thus, in an embodiment of the present process, a slightly modified SLIC approach is used for image abstraction utilizing K-means clustering in geodesic image distance in CIELab color space. (But other forms of clustering and other types features may be used, for instance, color space such as RGB could be utilized.) K-means clustering is a method of cluster analysis that partitions n observations into k clusters in which each observation is assigned to the cluster with the nearest mean. Geodesic image distance guarantees connectivity, while retaining the locality, compactness and edge awareness of SLIC superpixels.

Referring again to FIG. 2, the process includes calculating element uniqueness 204 (a first image measure) based on image elements, which can be used to produce a uniqueness image. Element uniqueness is generally defined as the rarity of a element i given its position $p_i$ and discriminating feature value $c_i$ (e.g. the discriminating feature is based on color in CIELab space) compared to all other elements j:

$$U_i = \sum_{j=1}^{N} \|c_i - c_j\|^2 \cdot \underbrace{w(p_i, p_j)}_{w_{ij}^{(p)}}. \tag{1}$$

In the above Equation 1, $w_{ij}^{(p)}$ controls the degree of locality of the uniqueness measure. A local function, $w_{ij}^{(p)}$, gives higher weight to elements in the vicinity of element i. The global and local contrast estimation are effectively combined with control over the influence radius of the uniqueness operator. The local function $w_{ij}^{(p)}$ yields a local contrast term, which tends to overemphasize object boundaries in the saliency estimation, whereas setting $w_{ij}^{(p)}$ approximately equal to one yields a global uniqueness operator, which cannot represent sensitivity to local contrast variation.

Evaluating Equation 1 globally generally requires $O(N^2)$ operations, where N is the number of elements. In the case where each element is a pixel, evaluating equation 1 in real-time may not be feasible. To reduce complexity, some related processes down-sample the input image to a resolution where a quadratic number of operations is feasible (which reduces the number of processed pixels, creating a low resolution image where each pixel represents a group of corresponding pixels from the full resolution image). But as discussed previously, saliency maps computed on down-sampled images cannot preserve sharply localized contours and generally exhibit a high level of blurriness, which can be undesirable.

For a Gaussian weight $$w_{ij}^{(p)} = \frac{1}{Z_i} \exp\left(-\frac{1}{2\sigma_v^2} \|p_i - p_j\|^2\right)$$

Equation 1 can be evaluated in linear time $O(N)$. $\sigma$ controls the range of the uniqueness operator and $Z_i$ is the normalization factor ensuring that: $\Sigma_{j=1}^{N} w_{ij}^{(p)} = 1$.

Equation 1 is then decomposed by factoring out the quadratic error function:

$$U_i = \sum_{j=1}^{N} \|c_i - c_j\|^2 w_{ij}^{(p)} \tag{2}$$

$$= c_i^2 \underbrace{\sum_{j=1}^{N} w_{ij}^{(p)}}_{1} - 2c_i \underbrace{\sum_{j=1}^{N} c_j w_{ij}^{(p)}}_{blur\ c_j} + \underbrace{\sum_{j=1}^{N} c_j^2 w_{ij}^{(p)}}_{blur\ c_j^2}.$$

Both terms $\Sigma_{j=1}^{N} c_j w_{ij}^{(p)}$ and $\Sigma_{j=1}^{N} c_j^2 w_{ij}^{(p)}$ can be evaluated using a Gaussian blurring kernel on color $c_j$ and the squared color $c_j^2$. Gaussian blurring is decomposable (separable) along the x and y axis of the image and can thus be efficiently evaluated. In an implementation, permutohedral lattice embedding is utilized, which yields a linear time approximation of the Gaussian filter in arbitrary dimensions. The permutohedral lattice function exploits the band limiting effects of Gaussian smoothing, such that a correspondingly filtered function can be well approximated by a sparse number of samples.

A Gaussian weight $w_{ij}^{(p)}$ is utilized to evaluate Equation 1 in linear time, without crude approximations such as histograms or distance to mean color. The parameter a can be set to 0.25 to allow for a balance between local and global effects.

Referring again to FIG. 2, the processing continues with calculating element spatial distribution 206 (the second image measure of contrast) based on the abstraction, which can be used to produce a distribution image. With regard to this second measure of contrast, the element distribution measure for a segment i is defined by using the spatial variance of its color $c_i$, that is, its occurrence is measured elsewhere in the image. A low variance indicates a spatially compact object which should be considered more salient than spatially widely distributed elements. Therefore:

$$D_i = \sum_{j=1}^{N} \|P_j - \mu_i\|^2 \underbrace{w(c_i, c_j)}_{w_{ij}^{(p)}}, \quad (3)$$

In Equation 3, $w_{ij}^{(c)}$ describes the similarity of color $c_i$ and color $c_j$ of elements i and j, respectively, $p_i$ is again the position of segment i, and $\mu_i = \Sigma_{j=1}^{N} w_{ij}^{(c)} p_j$ defines the weighted mean position of color $c_i$. Similarly to the uniqueness measure in equation (1), $c_i$ may be any discriminating feature of element i.

Naive evaluation of Equation 3 has quadratic runtime complexity. By choosing the color similarity to be Gaussian:

$$w_{ij}^{(e)} = \frac{1}{Z_i} \exp\left(-\frac{1}{2\sigma_e^2} \|c_i - c_j\|^2\right)$$

Equation 3 can be efficiently evaluated in linear time:

$$\begin{aligned} D_i &= \sum_{j=1}^{N} \|p_j - \mu_i\|^2 w_{ij}^{(e)} \\ &= \sum_{j=1}^{N} p_j^2 w_{ij}^{(e)} - 2\mu_i \underbrace{\sum_{j=1}^{N} p_j w_{ij}^{(e)}}_{\mu_i} + \mu_i^2 \underbrace{\sum_{j=1}^{N} w_{ij}^{(e)}}_{1} \\ &= \underbrace{\sum_{j=1}^{N} p_j^2 w_{ij}^{(e)}}_{blur\ p_j^2} - \underbrace{\mu_i^2}_{blur\ p_j} \end{aligned} \quad (4)$$

In the above equation, the position $p_j$ and squared position $p_j^2$ are blurred in the three dimensional (3-D) color space. An efficient evaluation can be made by discretizing the color space and then evaluating a separable Gaussian blur along each of the L, a and b dimensions. Since the Gaussian filter is additive, position values associated to the same color can be added. As in Equation 2, the permutohedral lattice is used as a linear approximation to the Gaussian filter in the CIELab color space. In Equation 4, the parameter σ controls the color sensitivity of the element distribution, and a value of σ=20 can be utilized.

Generalization of the uniqueness and spatial distribution measures in equations (1) and (3), respectively, may be accomplished by utilizing any metric known in the art as an alternative to $\|c_i - c_j\|^2$ or $\|p_i - \mu_j\|^2$. For example, Euclidian, Mahalanobis, mutual information, or cross-correlation based metrics may be used. Similarly, any weight function known in the art may be used instead of the Gaussian function, $w_{ij}$. However, these generalizations may require straightforward calculation of the measures, not allowing the reduction in complexity as shown in equations (2) and (4).

In summary, by evaluation of two Gaussian filters two non-trivial, but intuitively defined image measures can be calculated (steps 204 and 206 of FIG. 2) on a per-element basis. Color values in the image are filtered to compute the uniqueness of an element, and position values in the CIELab color space are filtered to provide the element distribution. With regard to FIG. 2, the next step is to combine 208 both of these image measures, while accounting for the different scaling and units associated to them, in order to compute a per-element saliency measure.

The saliency assignment process begins by normalizing both uniqueness $U_i$ and distribution $D_i$ measures to the range [0 ... 1]. Both measures are taken as being independent, and are then combined as follows to compute a saliency value for each element:

$$S_i = U_i \cdot \exp(-k \cdot D_i), \quad (5)$$

It was found that the distribution measure $D_i$ is of higher significance and discriminative power than $U_i$. Therefore, an exponential function may be used to emphasize $D_i$, and a scaling factor of k=6 may be utilized for the exponential.

Lastly, in step 210, a final saliency value is assigned to each image pixel, which can be interpreted as an up-sampling of the per-element saliency $S_i$. However, naive up-sampling by assigning $S_i$ to every pixel contained in element i carries over all segmentation errors of the abstraction algorithm. Instead, an idea proposed in the context of range image up-sampling is applied to the current framework. In particular, the saliency $S_i$ of a pixel is defined as a weighted linear combination of the saliency $S_j$ of its surrounding image elements:

$$\hat{S}_i = \sum_{j=1}^{N} w_{ij} S_j. \quad (6)$$

Choosing a Gaussian weight:

$$w_{ij} = \frac{1}{Z_i} \exp\left(-\frac{1}{2}(\alpha \|c_i - c_j\|^2 + \beta \|p_i - p_j\|^2)\right)$$

ensures that the up-sampling process is both local and feature (e.g. color) sensitive. Here, α and β are parameters controlling the sensitivity to color and position. It was found that α=1/30 and β=1/30 worked well in practice, and that the RGB color space outperformed the CIELab color space for up-sampling.

Thus, in step 208 a per element saliency is computed, and in step 210 the per-pixel saliency is derived producing the saliency map.

As for the image measures in Equations 1 and 3, Equation 6 describes a high-dimensional Gaussian filter and can thus be evaluated within the same filtering framework. The saliency value of each element is embedded in a high-dimensional RBGXY space, using the elements position $p_j$ and its color value $c_j$. In some embodiments, since the abstract elements do not have a regular shape, a point sample is created in RGBXY space at each pixel position $p_i$ within a particular element and blur the RGBXY space along each of its dimensions. The per-pixel saliency values can then be retrieved with a lookup in that high-dimensional space using the pixel's position and its color value in the input image.

Referring again to FIG. 2, the last step is to produce 210 a pixel accurate saliency map for generating a salient image that is closely related to a ground truth image (derived from the source image). The resulting pixel-level saliency map can have an arbitrary scale, so that it may be beneficial to rescale the saliency map to the range [0 . . . 1] or to contain at least 10% saliency pixels. (This is equation 6, above.)

Thus, the process computes the saliency of an image by first abstracting it into small, perceptually homogeneous elements. It then applies a series of three Gaussian filtering steps in order to: (1) compute measures such as the element uniqueness, U, and element spatial distribution $D_i$, (2) combine these measures into one per-element saliency measure, $S_i$, and then (3) refine the per-element saliency measure into a per-pixel saliency measure resulting in a saliency map. Accordingly, the image measures as well as the saliency measure can be efficiently computed based on N-D Gaussian filtering.

Figure 3B:
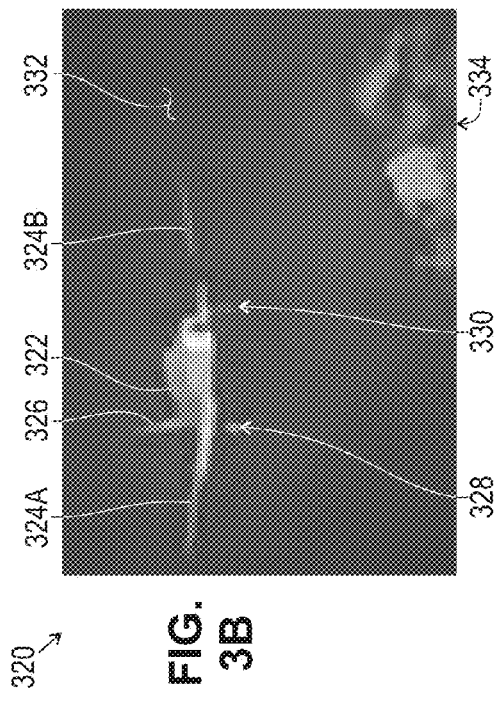
FIGS. 3A to 3D depict a series of four images to visually illustrate how input source image data is processed to obtain a salient image that preserves the salient features of the input or source image in accordance with the present invention.
Figure 3D:
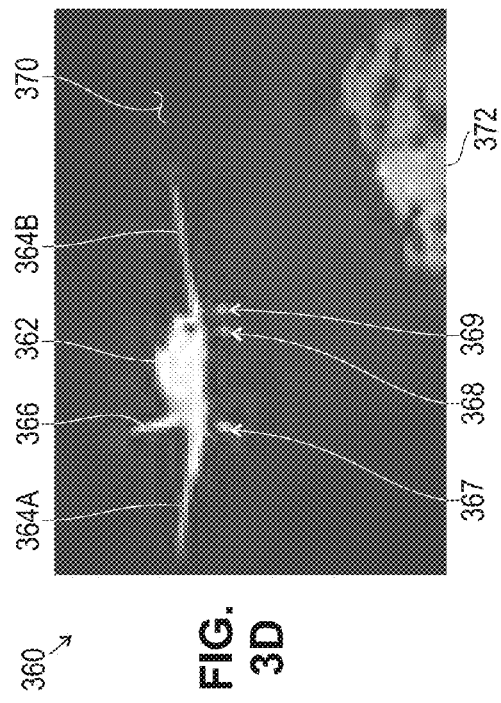
Figure 3A:
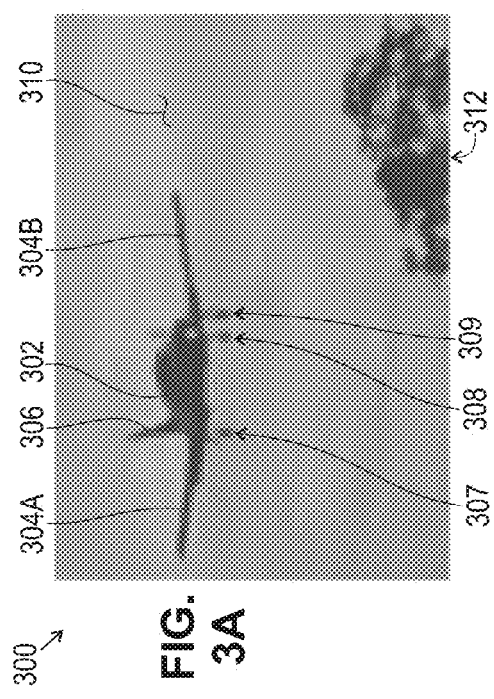
Figure 3C:
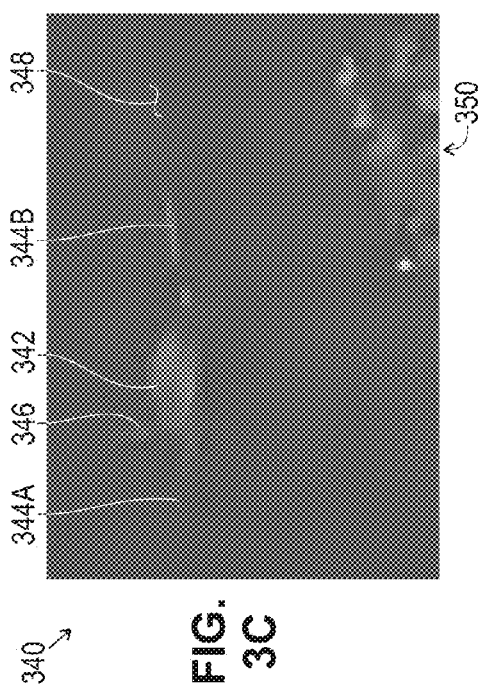

FIGS. 3A to 3D depict a series of four images that provides a visual illustration of how input source image data is processed in accordance with the methods described herein to obtain a salient image that preserves the salient features of the input or source image. Thus, FIG. 3A depicts an airplane source image 300 that includes a fuselage 302, wings 304A and 304B, a tail 306 and three wheels 307, 308 and 309 (the landing gear), and that also includes a background area 310 (the sky) and a portion of a tree 312. In accordance with the present process, the airplane source image 300 is first processed to abstract the pixels into image elements that preserve relevant structure while removing undesirable details (not shown). This abstracted data is then utilized to calculate element uniqueness (the first measure of contrast) and this data is used to produce the uniqueness image 320 shown in FIG. 3B. As shown in FIG. 3B, the uniqueness image includes the fuselage 322, a first wing 324A and a second faint wing 324B, a tail 326, a first wheel 328 and second faint wheel 330, the background 332 and the tree 3346. Next, in accordance with the present process, the abstracted data is again utilized to calculate element spatial distribution (the second measure of contrast), and this data is used to generate the distribution image 340 shown in FIG. 3C. As shown in FIG. 3C, the distribution image includes a faint fuselage 342, a first faint wing 344A and a second faint wing 344B, a faint tail 346, but no wheels. The background 348 and the tree 350 are also visible, however. It should be recognized that in FIG. 3B one wheel that is present in the source image 300 is missing and in FIG. 3C all wheels present in the source image 300 are missing.

Lastly, in accordance with the process described herein, the element uniqueness and element spatial distribution data are combined to compute per-pixel saliency values that are utilized to produce a pixel-accurate saliency map. The per-pixel saliency map data is utilized to produce the saliency image 360 shown in FIG. 3D. As shown in FIG. 3D, the saliency image 360 includes a fuselage 362, wings 364A and 364B, a tail 366, three wheels 367, 368 and 369 (the landing gear), a background area 370 and a portion of a tree 372. Thus, all of the salient features of the source image 300 of FIG. 3A have been preserved. It should be recognized that, due to the processing steps utilized, features of the source image that have been lost during processing (for example, one or more wheels of the airplane in the source image 300) can be transferred back into the saliency image 360. This is accomplished, in step 210 of FIG. 2, when the final saliency value is assigned to each image pixel by utilizing a Gaussian weight for the upsampling process to ensure that it is both local and color-sensitive.

The images shown in the series of FIGS. 3A-3D illustrate that the uniqueness measure prefers or favors unique colors, whereas the distribution measure favors compact objects. Thus, when these two measures are combined together, it is clear that the uniqueness and distribution measures provide improved performance over their use alone.

The methods described herein for saliency computation based on an image abstraction into structurally representative elements, and then using contrast-based saliency measures, can be consistently formulated as high-dimensional Gaussian filters. This filter-based formulation allows for efficient, fast computation and produces per-pixel saliency maps that are better than those produced by various state-of-the-art approaches when compared to ground truth images.

More sophisticated techniques for image abstraction, including robust color or structure distance measures, can be employed in other embodiments of the invention. Moreover, the filter-based formulation is sufficiently general to serve as an extendable framework, for example, to incorporate higher-level features such as face detectors and the like into the system.

One skilled in the art understands, however, that saliency estimation based on color contrast may not always be feasible, for example, in the case of lighting variations, or when fore-ground and background colors are very similar. In such cases, the threshold procedures used for all the above evaluations can result in noisy segmentations. An option that significantly reduces this effect is to perform a single min-cut based segmentation as a post process, using the saliency maps generated from the above method as a prior for the min-cut data term, and color differences between neighboring pixels for the smoothness term. When binary saliency maps are required for challenging images, the graph structure facilitates smoothness of salient objects and significantly improves the performance of the above described process.

Figure 4A:
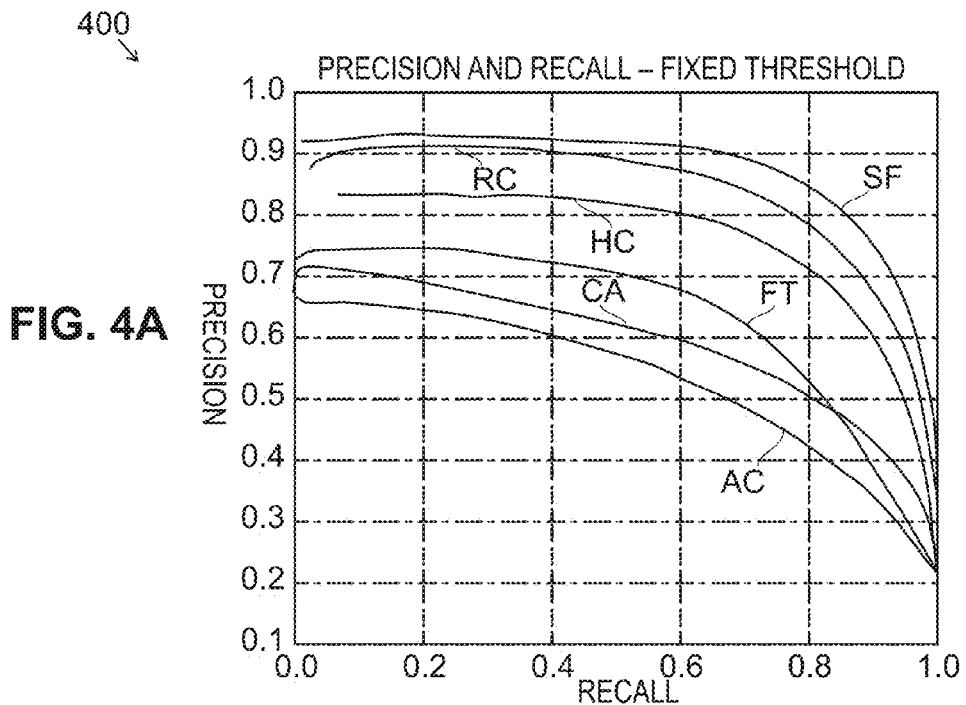
FIGS. 4A and 4B are charts illustrating performance results by measuring the precision and recall of a process according to the invention in comparison to known methods.
Figure 4B:
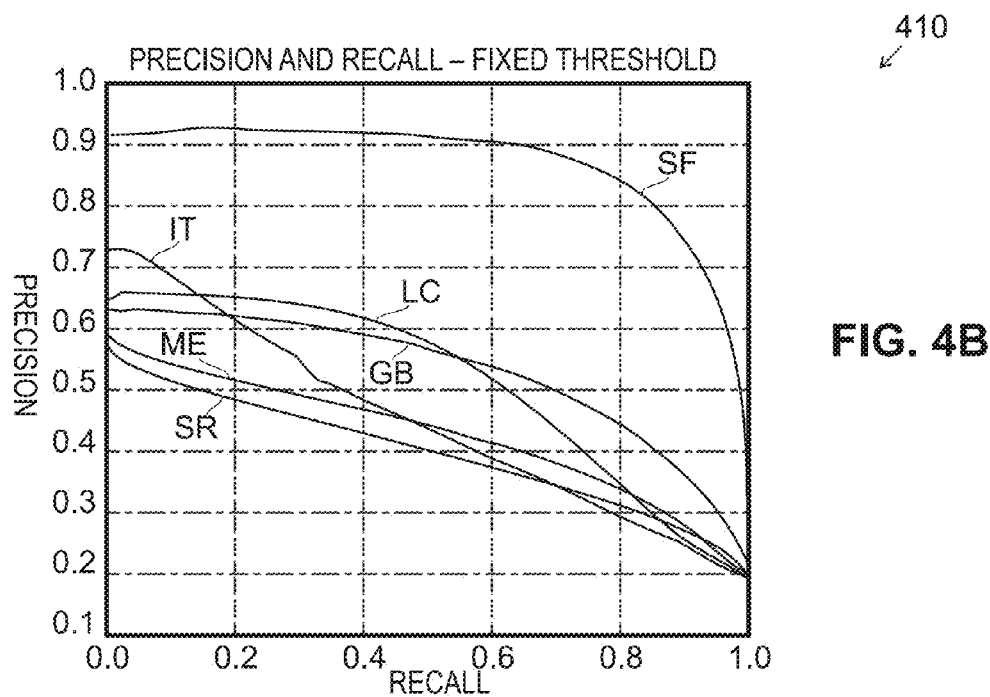

The processes described herein were compared to previous approaches on a database of one thousand (1000) images with binary ground truth. In particular, the performance of the present process was evaluated by measuring its precision and recall rate. Precision corresponds to the percentage of salient pixels correctly assigned, while recall corresponds to the fraction of detected salient pixels in relation to the ground truth number of salient pixels. High recall can be achieved at the expense of precision, and vice-versa, so both measures should be (and were) evaluated together. In an experiment, binary masks were compared for every possible threshold in the range of 0-255, and with reference to FIGS. 4A and 4B, the resulting curves 400 and 410 were charted as shown. The present saliency process curve is labeled "SF" in both FIGS. 4A and 4B, and as shown produced results closest to the ground truth at every threshold for any given recall rate in comparison to all of the other methods. In FIG. 4A, the other approaches used for comparison purposes included global-contract saliency (HC and RC), frequency-tuned saliency (FT), context-aware saliency (CA), and salient region detection (AC). In FIG. 4B, the other approaches used for comparison purposes included visual attention measure (IT), spatiotemporal cues (LC), graph-based saliency (GB), fuzzy growing (MZ), and spectral residual saliency (SR). In another experiment (not shown) the present saliency method was shown to perform robustly over a wide range of image elements, only exhibiting a drop in accuracy for an extremely low number of image elements (which was, in that case, 10 image elements).

It is also contemplated that the above described methods can be utilized to generate motion saliency maps. In particular, motion saliency can be accomplished by building on the above explained processes to produce an accurate motion saliency map. Objects can be identified as being salient if such objects exhibit different motion patterns than a majority of a scene. For example, a static camera takes pictures of a car moving from left to right against a fixed background, and thus the car should be identified as the salient feature. In a more advanced example, a panning camera (moving camera) follows a car from left to right such that the background is moving and the car is essentially static. In this case, the car should still be identified as the salient feature. In a complex example, the camera is zooming into (changing focal length and focus) a moving car so that every image pixel seems to be moving in a different direction. In this complex example, the car should still be identified as the salient feature.

In order to compute a proper saliency map for each of the three moving car examples, two adjacent frames of a video are first aligned or registered with a global transformation (such as an affine map, which in geometry is a transformation which preserves straight lines and ratios of distances between points lying on a straight line). This removes any camera motion (panning, rotation, zooming and the like) as long as a background can be identified. In an implementation, the background can be identified by use of the image saliency processes described above. (Such a process works well except in the case wherein a foreground object covers the complete image, and almost no background is visible.)

In other embodiments, feature points can be detected in the first and the second frame (using standard feature detectors like SIFT), and then an affine transformation can be computed between the first and the second image with a robust model fitting technique like "RANSAC" (for example, randomly picking a subset of feature points, computing a global transform, and then checking how well the rest of the features correspond to that model). The RANSAC procedure is commonly used to perform such model estimation tasks where some part of the image are "inliers" (e.g, our background) and some features are "outliers" (moving foreground that should be ignored in this pre-process aspect).

The remaining optical flow between the two aligned video frames is then computed, and since the background is aligned there will be only flow for foreground objects (for example, foreground objects that move differently than the background). The optical flow range is then clustered into basic flow elements, and then their uniqueness is computed and their spatial distribution is computed to result in a video saliency map that shows which objects are moving independently from a background (such as players on a basketball court, soccer players on a pitch, football players on a field, and the like including non-sport applications). The saliency maps for each frame of a video are then processed in chronological order to produce a motion saliency image.

It should be understood that the motion-based saliency can be combined in arbitrary ways with the color-based saliency described hereinabove. Thus, it may be possible to have, for example, motion uniqueness and distribution or color uniqueness and distribution. Moreover, a system may be implemented to potentially provide distance and/or depth uniqueness and distribution, infrared information, or other types of visual information.

Figure 5:
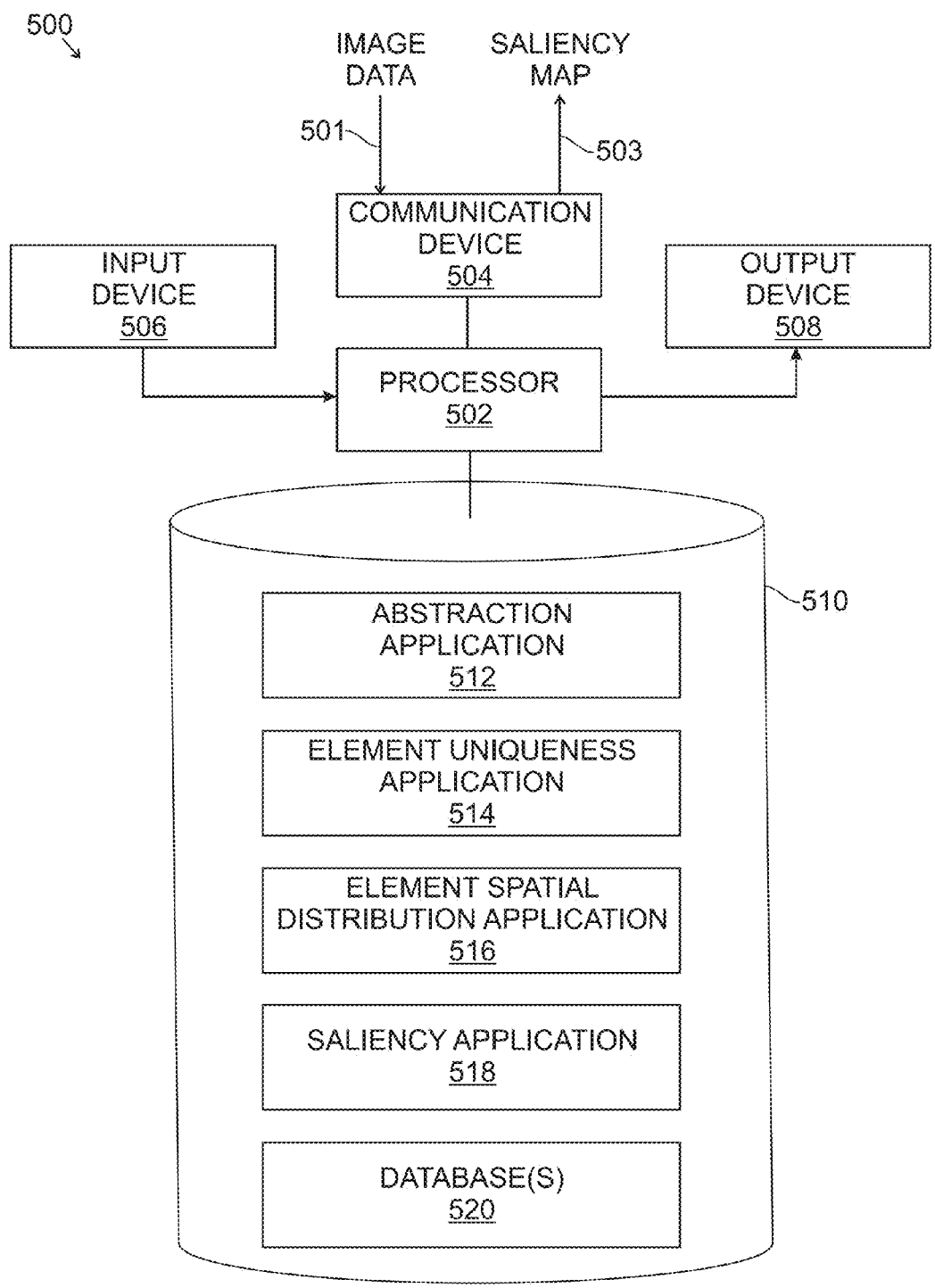
FIG. 5 is a block diagram of a saliency image processing device according to an embodiment of the invention.

FIG. 5 is a block diagram of a saliency image processing device 500 according to an embodiment. The saliency image processing device may be a computer that is conventional in its hardware aspects but may be controlled by software to cause it to operate in accordance with aspects of the methods presented herein. In particular, the saliency image processing device may include a computer processor 502 operatively coupled to a communication device 504, an input device 506, an output device 508, and a storage device 510.

The computer processor 502 may constitute one or more conventional processors, and operates to execute processor-executable steps, contained in program instructions described herein, so as to provide desired functionality. For example, in an implementation an Intel® Core i7-920, 2.6 GHz processor configured with 3 GB of random access memory (RAM) was utilized to process input source image data 501 and to provide a saliency map output 503 in accordance with the embodiments described herein. It was observed that the processing time for the methods described herein was comparable or faster than those of other approaches, with most of the processing time spent on abstraction (about 40%) and on the final saliency upsampling (about 50%). Thus, only about 10% of the processing time was spent on the actual per-element image measures and saliency computation.

Referring again to FIG. 5, the communication device 504 may be used to facilitate communication with, for example, image devices such as a digital camera or other devices configured to provide digital and/or analog source image data. Communication device 504 may, for example, have capabilities for engaging in data communication over conventional computer-to-computer data networks, and/or may have wireless communications capability (for example, enabling a mobile device to communicate directly with the saliency image processing device 500). Any such data communication may be in digital form and/or in analog form.

Input device 506 may comprise one or more of any type of peripheral device typically used to input data into a computer. For example, the input device 506 may include a keyboard, a computer mouse and/or a touchpad or touch screen. Output device 508 may comprise, for example, a display screen and/or a printer.

Storage device 510 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as flash memory devices. Any one or more of the listed storage devices may be referred to as a "computer-readable medium", a "memory", "storage" or a "storage medium".

Storage device 510 stores one or more programs for controlling the processor 502. The programs comprise program instructions that contain processor-executable process steps, including, in some implementations, process steps that constitute processes provided in accordance with principles of the processes presented herein.

The programs may include an abstraction application 512 that manages a process 202 by which source image data is processed to decompose it into compact, perceptually homogenous image elements that abstract unnecessary details. In addition, an element uniqueness application 514 manages a process 204 by which the compact image elements are processed to provide uniqueness data, and an element spatial distribution application 516 manages a process 206 wherein the compact image elements are processed to provide spatial distribution data. In some embodiments, the uniqueness application 514 and the distribution application 516 are implemented as Gaussian filters to compute two non-trivial, but intuitively defined image measures on a per-element (per-pixel) basis. A saliency application 518 manages a process 208 wherein the image measures are combined so as to compute a per-element saliency assignment that may be utilized to generate a per-pixel saliency map in step 210. It should be understood that the programs stored in the storage device 510 may also include applications configured to generate motion saliency maps in accordance with the methods described herein.

Also shown in FIG. 5 are one or more databases 520 that are maintained by the saliency image processing device 500 on the storage device 510. Among these databases may be, for example, a source image database and a video image database.

The application programs of the saliency image processing device 500, as described above, may be combined in some embodiments, as convenient, into one, two or more application programs. Moreover, the storage device 510 may store other programs or applications, such as one or more operating systems, device drivers, database management software, web hosting software, and the like.

The flow charts and descriptions appearing herein should not be understood to prescribe a fixed order of performing the method steps described therein. Rather the method steps may be performed in any order that is practicable.

Although specific exemplary embodiments have been described herein, it should be understood that various changes, substitutions, and alterations apparent to those skilled in the art can be made to the disclosed embodiments without departing from the spirit and scope of the invention as set forth in the appended claims.

What is claimed is:

1. A method, comprising:
    decomposing, by a processor, an image into elements, wherein each element comprises at least one pixel;
    calculating, by the processor using a first Gaussian filter, a first image measure in linear time, the first image measure indicative of each element's uniqueness in the image on a per element basis;
    calculating, by the processor using a second Gaussian filter, a second image measure in linear time, the second image measure indicative of each element's spatial distribution in the image on a per element basis; and
    providing, by the processor, a per element saliency measure by combining the first image measure and the second image measure.

2. The method of claim 1, further comprising generating, by the processor based on the per element saliency measure, a pixel-accurate image saliency map.

3. The method of claim 2, wherein generating the pixel accurate saliency map comprises utilizing an up-sampling process that is both local and feature sensitive.

4. The method of claim 1, wherein at least one of the first image measure and the second image measure is calculated based on at least one discriminating feature extracted from the pixels associated with each element.

5. The method of claim 4, wherein the discriminating feature comprises at least one of a color feature, a texture feature, a disparity feature, or a motion feature.

6. The method of claim 1, wherein decomposing comprises utilizing, by the processor, a modified simple linear iterative clustering (SLIC) superpixels protocol that utilizes K-means clustering in geodesic image distance in CEILab space.

7. The method of claim 1, wherein combining the first image measure and the second image measure comprises:
    normalizing uniqueness measures and distribution measures to a range; and
    combining each normalized uniqueness measure with a corresponding distribution measure to obtain the per element saliency measure.

8. A non-transitory computer-readable medium storing instructions configured to cause a processor to:
    decompose an image into elements, wherein each element comprises at least one pixel;
    calculate using a first Gaussian filter, a first image measure in linear time, the first image measure indicative of each element's uniqueness in the image on a per element basis;
    calculate, by using a second Gaussian filter, a second image measure in linear time, the second image measure indicative of each element's spatial distribution in the image on a per element basis; and
    provide a per element saliency measure by combining the first image measure and the second image measure.

9. The computer-readable medium of claim 8, further comprising instructions configured to cause the processor to generate, based on the per element saliency measure, a pixel-accurate image saliency map.

10. The computer-readable medium of claim 9, wherein the instructions for generating the pixel accurate saliency map further comprise instructions configured to cause the processor to utilize an up-sampling process that is both local and feature sensitive.

11. The computer-readable medium of claim 8, wherein the instructions for calculating the first image measure or the second image measure further comprise instructions configured to cause the processor to calculate the first image measure or the second image measure based on at least one discriminating feature extracted from the pixels associated with each element.

12. The computer-readable medium of claim 8, wherein the instructions for decomposing further comprise instructions configured to cause the processor to utilize a modified simple linear iterative clustering (SLIC) superpixels protocol that utilizes K-means clustering in geodesic image distance in CEILab space.

13. The computer-readable medium of claim 8, wherein the instructions for combining the first and second image measures further comprise instructions configured to cause the processor to:
    normalize uniqueness measures and distribution measures to a range; and
    combine each normalized uniqueness measure with a corresponding distribution measure to obtain the per element saliency measure.

14. An apparatus, comprising:
    a processor;
    a communication device operably connected to the processor; and
    a storage device operably connected to the storage device, the storage device storing non-transitory instructions configured to cause the processor to:
        decompose an image into elements, wherein each element comprises at least one pixel;
        calculate using a first Gaussian filter, a first image measure in linear time, the first image measure indicative of each element's uniqueness in the image on a per element basis;
        calculate, by using a second Gaussian filter, a second image measure indicative of each element's spatial distribution in the image on a per element basis; and
        provide a per element saliency measure by combining the first image measure and the second image measure.

* * * * *